(12) United States Patent
Edalat et al.

(10) Patent No.: US 11,594,149 B1
(45) Date of Patent: Feb. 28, 2023

(54) SPEECH FLUENCY EVALUATION AND FEEDBACK

(71) Applicant: Vivera Pharmaceuticals Inc., Newport Beach, CA (US)

(72) Inventors: Paul Edalat, Newport Beach, CA (US); Gerald A. Maguire, San Juan Capistrano, CA (US); Mehdi Hatamian, Mission Viejo, CA (US)

(73) Assignee: Vivera Pharmaceuticals Inc., Newport Beach, CA (US)

( * ) Notice: Subject to any disclaimer, the term of this patent is extended or adjusted under 35 U.S.C. 154(b) by 0 days.

(21) Appl. No.: 17/715,532

(22) Filed: Apr. 7, 2022

(51) Int. Cl.
| | | |
|---|---|---|
| *G10L 25/60* | (2013.01) | |
| *G09B 19/06* | (2006.01) | |
| *G10L 15/22* | (2006.01) | |
| *G10L 25/18* | (2013.01) | |
| *G09B 5/02* | (2006.01) | |
| *G10L 25/51* | (2013.01) | |

(52) U.S. Cl.
CPC ............... *G09B 19/06* (2013.01); *G09B 5/02* (2013.01); *G10L 15/22* (2013.01); *G10L 25/18* (2013.01); *G10L 25/51* (2013.01); *G10L 2015/225* (2013.01)

(58) Field of Classification Search
CPC ........... G09B 19/06; G09B 5/02; G10L 15/22; G10L 25/18; G10L 25/51; G10L 2015/225
See application file for complete search history.

(56) References Cited

U.S. PATENT DOCUMENTS

| | | | |
|---|---|---|---|
| 2011/0040554 A1* | 2/2011 | Audhkhasi | G09B 19/04 704/235 |
| 2016/0189565 A1* | 6/2016 | Rot | G10L 25/66 434/185 |
| 2018/0197439 A1* | 7/2018 | Gordon | G09B 19/04 |
| 2018/0286430 A1* | 10/2018 | Shapira | A61B 5/7282 |

* cited by examiner

*Primary Examiner* — Abul K Azad
(74) *Attorney, Agent, or Firm* — Genius Patent APC; Bruce Angus Hare

(57) ABSTRACT

Speech fluency evaluation and feedback tools are described. A computing device such as a smartphone may be used to collect speech (and/or other data). The collected data may be analyzed to detect various speech events (e.g., stuttering) and feedback may be generated and provided based on the detected speech events. The collected data may be used to generate a fluency score or other performance metric associated with speech. Collected data may be provided to a practitioner such as a speech therapist or physician for improved analysis and/or treatment.

20 Claims, 7 Drawing Sheets

SPEECH FLUENCY EVALUATION AND FEEDBACK

BACKGROUND

Many people may wish to evaluate fluency or other metrics related to speech or auditory performance. In addition, the scientific field of stuttering requires an accurate, real-world environment, metric related to stuttering.

Therefor there exists a need for a speech fluency evaluation and feedback tool that is available in real-time.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide speech fluency evaluation and feedback tools. Some embodiments may include and/or utilize a device such as a computing device (e.g., a smartphone) to collect speech (and/or other data). The collected data may be analyzed to detect various speech events (e.g., stuttering) and feedback may be generated and provided based on the detected speech events. The collected data may be used to generate a fluency score or other performance metric associated with speech.

Collected data may be provided to a practitioner such as a speech therapist or physician for improved analysis and/or treatment. For example, a subject may not stutter when evaluated by a practitioner such as a doctor, but may stutter in front of a boss or other superior. As another example, a subject may stutter differently when evaluated by a practitioner such as a doctor, but may stutter differently in front of a boss or other superior.

Figure 1:
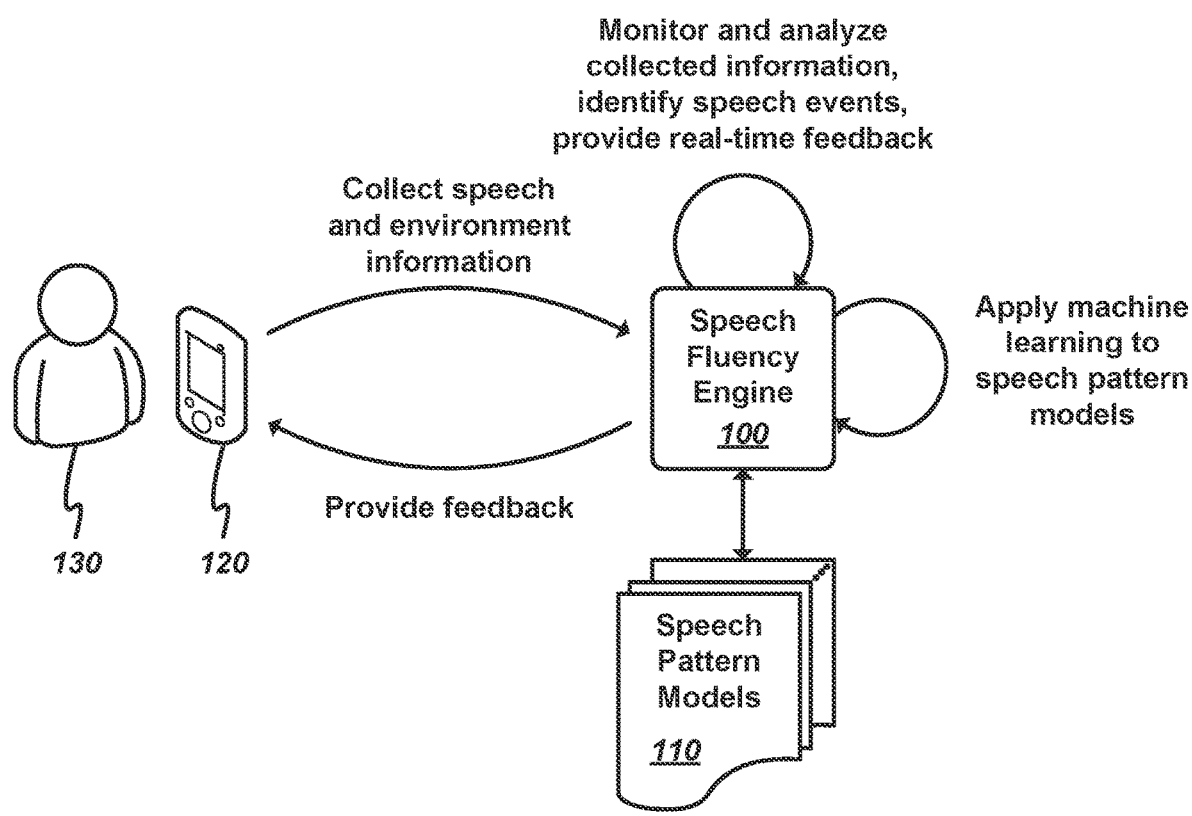
FIG. 1 illustrates an example overview of one or more embodiments described herein, in which speech is evaluated and feedback provided in real-time.

FIG. 1 illustrates an example overview of one or more embodiments described herein, in which speech is evaluated and feedback provided in real-time. In this example, speech fluency engine 100 may include, have access to, and/or otherwise be able to interact with various speech pattern models 110. Speech, environment, and/or other information may be collected via a user device 120 (and/or other appropriate resources) associated with a subject 130. The collected information may be analyzed to identify speech events and/or provide real-time feedback to the subject 130 via user device 120 (and/or other appropriate resources). Speech fluency engine 100 may apply machine learning to train speech pattern models 110.

As shown, speech and/or environmental information may be collected via a resource such as a microphone, camera, and/or other appropriate sensors (e.g., facial movement sensors attached to the jaw, cheeks, tongue, and/or other appropriate regions of a subject), associated with speech fluency engine 100 or user device 120. Such speech and environmental information may be continuously captured and/or captured based on some criteria (e.g., minimum volume). Speech fluency engine 100 may monitor and analyze the collected information, identify speech events (and/or otherwise evaluate speech performance), and provide real-time analysis feedback and/or later feedback or analysis. Such feedback may include performance metrics such as a fluency score. Speech fluency engine 100 may apply machine learning to generate and/or update speech pattern models 110 that may be used to identify speech events and/or otherwise evaluate speech.

Speech fluency engine 100 may be a computing device or other appropriate device or system that may be able to receive and analyze speech and/or other data and generate feedback in real-time and/or during post-processing or other follow-on analysis. In some embodiments, speech fluency engine 100 may include, utilize, and/or otherwise be implemented using a user device such as user device 120, a server, and/or other appropriate resources (e.g., a storage or application programming interface (API) available via the Internet).

Each speech pattern model 110 may include, for example, specified patterns and/or matching criteria that may be used to identify events. For instance, a speech pattern model 110 may include audio and/or video data, filtering parameters or attributes, matching criteria such as minimum or maximum thresholds, and/or other appropriate information. In some embodiments, speech pattern models 110 may include (and/or otherwise reference) information such as feedback associated with an event type, scoring or evaluation metrics, etc. Speech pattern models 110 may be associated with audio data, video data (e.g., facial movement, hand gestures or other body movements, etc.), text-based data, and/or any other types of data that may be associated with fluent or non-fluent speech events. Speech pattern models 110 may be trained along multiple vectors (e.g., audio, video, etc.) such that speech events may be more accurately detected and/or evaluated.

Speech pattern models 110 may be implemented using various machine learning and/or artificial intelligence algorithms and/or features. For instance, speech pattern models 110 may include, utilize, and/or otherwise implement recursive neural networks (RNNs). Speech pattern models 110 may be trained using various appropriate datasets related to various use cases. For instance, if a speech pattern model 110 is associated with detection of stuttering events, the dataset may include input data such as recorded speech, recorded video (e.g., captured video of the face of the speaker), and/or other input data (e.g., facial sensor data) and classification data provided by a practitioner such as a speech therapist (e.g., start and end time of each event, event type, etc.). As another example, if a speech pattern model 110 is associated with evaluating and/or improving performance in a second language, training data may include input data such as recorded speech and classification data provided by a practitioner such as a teacher.

Training data may be associated with various feedback elements and/or other resources. For instance, a speech therapist may associate each identified event with a type of feedback or specific feedback instructions (e.g., calming instructions, suggestion of alternative words, etc.). As another example, a teacher may associate each identified event with feedback such as suggested vocabulary, improved word order, etc. As another example, a public speaking instructor may associate each identified event with feedback related to, for instance, cadence (e.g., instructing a subject to speak more slowly), tone or volume, etc.

Speech events may include events such as "non-fluent" events (e.g., stuttering, incorrect vocabulary, etc.) and/or "fluent" events (e.g., fluent speech, correct vocabulary, a length of speech (as defined by time or other metric such as number of words) without a negative event, etc.). Different embodiments may include various different categories of events. Such events may be calculated in various appropriate ways (e.g., fluent speech may be calculated by summing the elapsed time associated with all fluent events and non-fluent speech may be calculated by summing the elapsed time associated with all non-fluent events). The ratio of the summed elapsed times (and/or other measure such as number of words) may be used to calculate a metric such as a fluency score.

User device 120 may be a computing device such as a smartphone, tablet, wearable device (e.g., smartwatch), and/or other device able to collect and analyze speech information and provide feedback. User device 120 may include various sensors (and/or connections thereto), such as microphones, location or movement sensors (e.g., global positioning system (GPS) sensors, accelerometers, etc.), cameras, etc. User device 120 may include various user interface (UI) features, such as a touchscreen or other display, keypads, speakers, haptic feedback elements, indicators, etc.

Subject 130 may be a student learning a new language, a person with a speech-related condition (e.g., stuttering), and/or other entity that may wish to evaluate fluency or other performance associated with speech.

As an example, subject 130 may be a person who stutters. Speech events may be associated with repeated sounds or syllables. Depending on the type of event, feedback may be provided. For instance, if speech similar to "Are you hungry? Would you like to eat din-din-din . . . " is detected, feedback may include text-based or audio instructions (e.g., try to relax, use learned breathing techniques, etc.). As another example, feedback may include audio stimulus such as a specific sound or prompt (e.g., a clap, bell, tone sequence, etc.).

As another example, subject 130 may be a person who stutters. The subject 130 and/or a practitioner (e.g., a doctor, speech therapist, etc.) may be evaluating a medication and/or other treatment (e.g., speech therapy) for efficacy. The subject 130 and/or associated practitioner may be able to evaluate treatments or protocols such as different medications, dosing schedules, dosages, speech therapies, etc. based on the fluency score or other performance metric associated with the treatment or protocol. The performance metric(s) may be generated by speech fluency engine 100. For instance, the subject 130 may or wear a device that collects speech and/or environmental information during waking hours and provides the collected information to a resource such as a smartphone, server, etc. The speech fluency engine 100 may measure, record, and/or analyze various aspects of stuttering and spoken speech in order to generate or calculate a score or metric related to stuttering. Such a stuttering metric may be based on captured speech and/or other collected data and/or analysis thereof, including, for example, percentage of syllables stuttered of syllables spoken, duration of the stuttering events (e.g., repetitions, pauses, blocks, etc.), percentage time or ratio of fluent speech relative to stuttered speech, and/or prosody or naturalness of speech, among others.

As yet another example, a subject 130 that is a student learning a new language may utilize speech fluency engine 100 to evaluate speech performance when using the new language, where the speech fluency engine 100 may ignore performance in any other language(s). In this context, speech events may be associated with behavior such as long delays between words, other indications of struggles (e.g., saying "umm" or speaking in an exasperated tone). Depending on the type of event, feedback may be provided (e.g., a prompt may be given for a next expected word or phrase). For instance, if speech similar to "Are you hungry? Would you like to eat . . . " is detected before a long pause, feedback may include a prompt for the next word (e.g., "dinner", "lunch", etc.). In this example, the feedback may be at least partly based on environmental factors (e.g., time of day, customs associated with the local region, etc.).

In some cases, live feedback may be detrimental to a subject 130. For example, real-time feedback provided to a subject 130 who stutters may cause an increase in non-fluent events such as stuttering. Thus, post-processing and/or real-time analysis may be used to generate a performance metric such as a fluency score that may not be provided to a subject 130 in real time. The performance evaluation may be utilized by a practitioner such as a doctor or speech therapist in a follow-on visit or other feedback (e.g., via email, text, phone, etc.) that may be provided after-the-fact such that medications, speech therapies, and/or other treatments or responses may be evaluated based on the performance metric. For instance, a doctor may adjust a medication, dosage, and/or treatment schedule based on such performance metrics. As another example, a speech therapist may adjust a training routine (e.g., duration, frequency, and/or content of training sessions or prescribed exercises) based on such performance metrics.

As still another example, subject 130 may be a person wishing to improve public speaking performance. Speech events may be associated with attributes such as delivery speed, volume, etc. For instance, speech may be converted to text and a number of words per specified time period (e.g., five seconds) may be used to measure speed and identify fast or slow speech relative to some specified goals or other performance thresholds. If fast speech is detected, feedback may be provided using a visual cue (e.g., a blinking red icon to indicate that speech should be slowed).

In addition to, and/or in place of such real-time feedback, performance information may be collected for analysis at a later time and/or data may be provided to other entities than the subject 130 (e.g., a practitioner such as a teacher, speech therapist, physician, etc.). Collected information may include, for instance, audio data (e.g., captured or recorded speech), environmental data (e.g., ambient noise, location, etc.), self-evaluation data (e.g., subjective evaluations such as mood, energy level, etc.), biometric data (e.g., heart rate, skin temperature, etc.), diet or medication (e.g., medications taken, consumption of alcoholic beverages or mind-altering substances, consumption of caffeine, etc.), and/or other relevant information.

Figure 2:
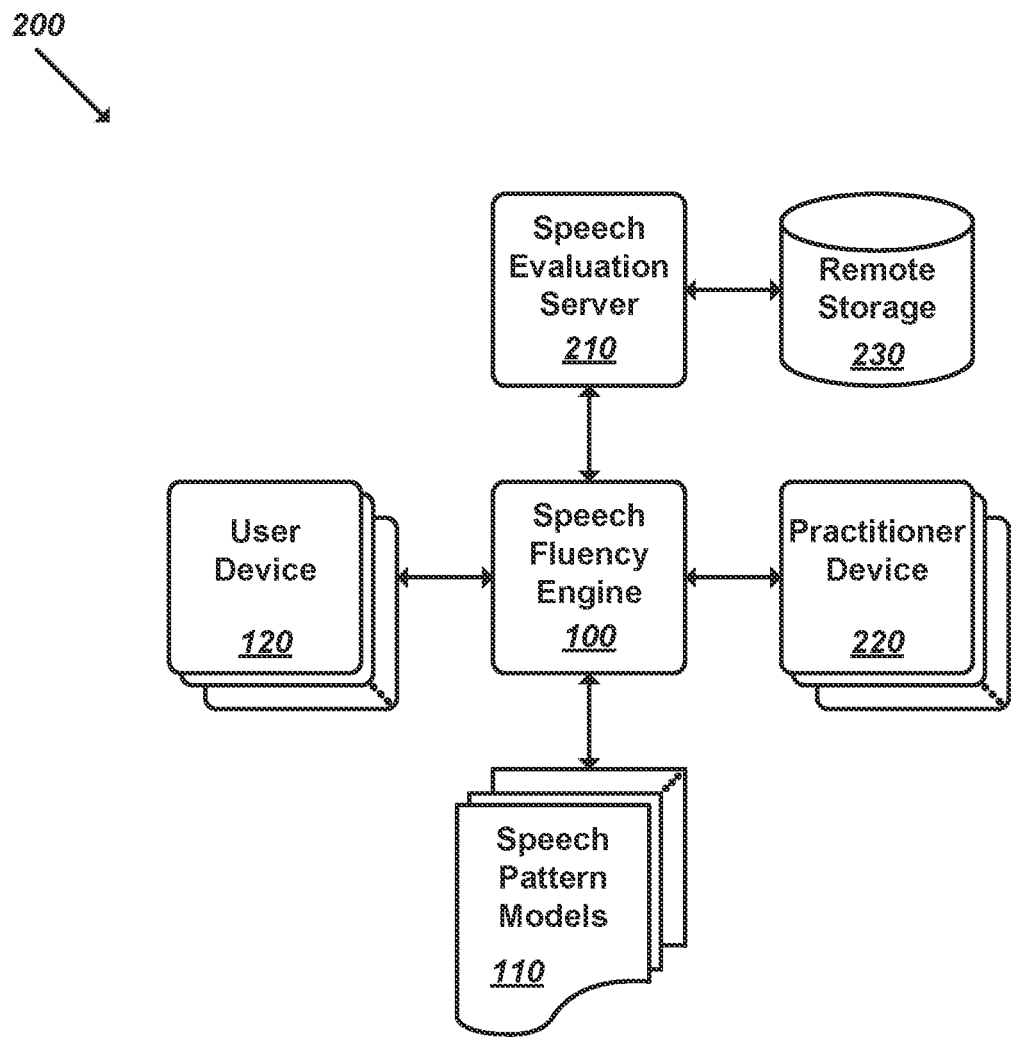
FIG. 2 illustrates an example environment of one or more embodiments described herein.

FIG. 2 illustrates a portion of an example environment 200 of one or more embodiments described herein. In this example, environment 200 may include speech fluency engine 100, user device 120, speech evaluation server 210, practitioner device 220, and remote storage 230. Environment 200 may include various other components (e.g., network communication pathways such as cellular networks, Wi-Fi, the Internet, etc.).

Speech fluency engine 100 may be a computing device such as a wearable device or other device that may easily be carried by a subject 130. Speech fluency engine 100 may be at least partly implemented by, and/or using, a device such as user device 120. Speech fluency engine 100 may be at least partly implemented by, and/or using, a device such as speech evaluation server 210. Speech fluency engine 100 may be at least partly implemented by, and/or using, a device such as practitioner device 220. In some cases, speech fluency engine 100 may be implemented using a single device, such as user device 120 or practitioner device 220.

User device 120 may be able to interact with speech fluency engine 100 across various local (e.g., a communication bus, a wireless channel such as Bluetooth, etc.) and/or distributed communication pathways (e.g., a cellular network, the Internet, etc.). User device 120 may provide sensor data to the speech fluency engine 100, such as audio captured via a microphone.

Speech evaluation server 210 may be, include, and/or utilize one or more computing devices such as servers. Speech evaluation server 210 may at least partly implement various features of speech fluency engine 100. For instance, in some embodiments, audio data may be sent from speech fluency engine 100 to speech evaluation server 210 for analysis (e.g., event detection).

Practitioner device 220 may be similar to user device 120 and may be associated with a practitioner rather than a subject 130. Example practitioner devices 220 include, for instance, smartphones, personal computers, laptops, tablets, etc. Practitioners may be able to access data associated with multiple subjects via practitioner device 220.

Remote storage 230 may include various elements or data, such as speech pattern models 110, subject data (e.g., profile data such as name, username, password, etc.), practitioner data (e.g., profile data, listings of associated subjects, etc.), collected sensor information, model training data, and/or other appropriate information.

The various elements of environment 200 may be able to communicate across various local and/or distributed communication channels, such as Bluetooth, Wi-Fi, cellular networks, the Internet, etc.

Figure 3:
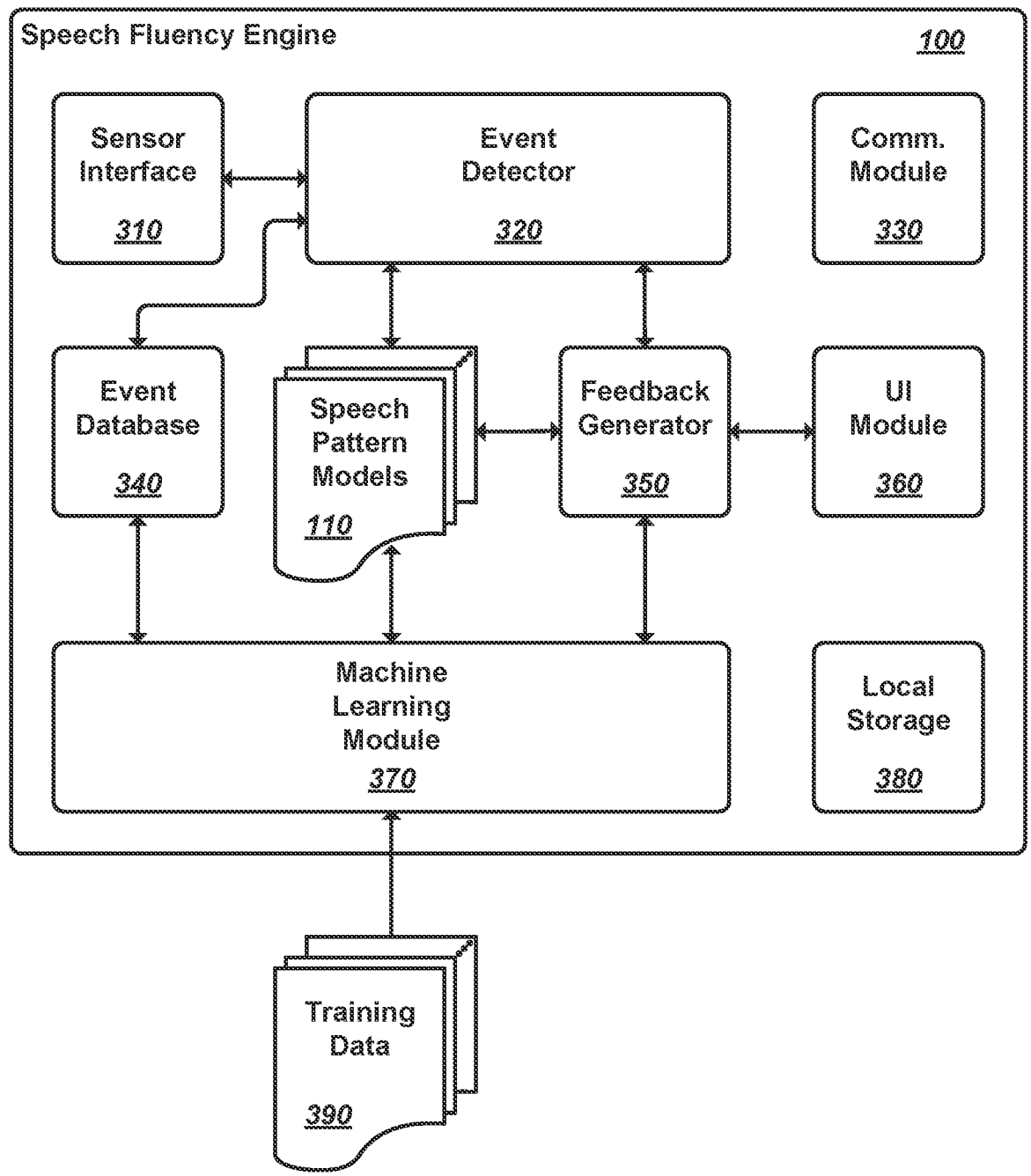
FIG. 3 illustrates a schematic block diagram of one or more embodiments of a speech fluency engine described herein.

FIG. 3 illustrates a schematic block diagram of one or more embodiments of a speech fluency engine 100 described herein. As shown, the speech fluency engine 100 may include sensor interface 310, event detector 320, communication module 330, event database 340, feedback generator 350, UI module 0360, machine learning module 370, and local storage 380. The various components of speech fluency engine 100 may be able to communicate using various appropriate channels (e.g., busses, wireless channels, etc.)

Sensor interface 310 may include various components that may be able to interact with sensors associated with the speech fluency engine 100. Sensors may be sub-components of the speech fluency engine 100 and/or may be provided by other elements or devices, such as user device 120. Sensor interface 310 may be able to receive sensor data in various appropriate formats (e.g., analog signals, digital information, etc.) and provide the information to event detector 320 and/or other components for analysis and/or processing. In some embodiments, sensor interface 310 may perform filtering or other processing of received data (e.g., received audio data may be filtered to isolate or emphasize audio associated with speech, speech may be converted to text, etc.). Sensor interface 310 may receive sensor data such as, for instance, captured audio and/or video, biometric information (e.g., heart rate, sleep duration, time spent exercising, etc.), movement or location information, etc. Sensor interface 310 may collect user-provided information, such as diet, subjective assessment of energy level or confidence level, etc.

Event detector 320 may receive sensor data via sensor interface 310 and identify events using speech pattern models 110. The received sensor data may be filtered or otherwise processed in various ways. For instance, data may be converted or mapped from time-domain representations to frequency-domain representations (e.g., using a Fourier transform). The sensor data (including processed and/or unprocessed sensor data) may be provided to, applied to, and/or otherwise analyzed using the various speech pattern models 110. One or more of the speech pattern models 110 may be associated with an indication that an event has been detected and/or that an event has been predicted to occur. Each detected event may be associated with various attributes or other information such as event type, unique event identifier, event duration, start and stop time, adjustment to a score or other performance metric, etc. Event detection information may be provided to event database 340, feedback generator 350 and/or other components, as appropriate.

Communication module 330 may be able to communicate among various internal and/or external resources (e.g., user devices 120, speech evaluation servers 210, etc.). Communication module 330 may include various interfaces and/or other resources that may allow various types of data to be received and/or provided by speech fluency engine 100. Communication module 330 may be able to communicate across various wireless and/or network channels (e.g., Bluetooth, Wi-Fi, the Internet, etc.).

Event database 340 may include, store, provide, reference, and/or otherwise be associated with event data. Such data may include event detection information such as, for example, a listing of speech pattern models 110 associated with the event, start time and stop time of the event (relative to an audio or other input), feedback provided, sensor data associated with the event (e.g., captured audio, environmental information, etc.), and/or other relevant information.

Feedback generator 350 may provide feedback to subjects 130 and/or practitioners via a resource such as user device 120 and/or practitioner device 220. Feedback generator 350 may receive event notifications from event detector 320. The notification may indicate information such as event type, associated speech pattern model(s) 110, and/or other information associated with the event (e.g., event identifier, event duration or start and stop time, etc.). Feedback may be provided in real time and/or used for later evaluation or assessment. Feedback may be generated based on various relevant factors, such as event type, associated speech pattern model(s) 110, event duration, user preferences or settings, environment (e.g., whether a subject 130 is at work, school, home, out in public, etc.), etc. Feedback may include, for instance, instructions, hints, prompts, etc. (e.g., suggested words or vocabulary, performance instructions (e.g., breathe deeply, slow down pace of speech, adjust tone, increase volume, etc.), prompts for subject emotional state (e.g., "comfortable", "nervous", etc.), etc.). Feedback may include positive indications or instructions, such as "maintain pace", "volume is suitable", "tone is confident", etc. Feedback generator 350 may generate a fluency score and/or other relevant performance metrics based on event detection, feedback, and/or other relevant factors.

Feedback may be provided via a resource such as UI module 360.

In some embodiments, a resource such as feedback generator 350 may collect feedback from users such as subjects 130 and/or practitioners. For instance, a subject 130 may indicate whether feedback was helpful or relevant. As another example, a practitioner may indicate whether a type of detected event was correct or incorrect.

UI module 360 may include various interfaces, elements, and/or other features that may allow interaction with a user such as a subject 130 or practitioner. UI module 360 may include and/or be implemented using various appropriate resources. For instance, UI module 360 may be implemented via a user device application, web browser, etc. UI module 360 may provide feedback and/or other output data to a user. UI module 360 may receive feedback and/or other information from users. UI module 360 may utilize various devices or components, such as a touchscreen of user device 120, a display of practitioner device 220, etc. UI module 360 may be utilized during "live" sessions, such as when a subject 130 is speaking and/or delayed sessions (e.g., when a practitioner reviews subject performance).

UI module 360 may include various selection features, display components, etc., that may allow various users to analyze information, update preferences or other operating parameters, and/or otherwise interact with the speech fluency engine 100. For instance, a practitioner may be able to browse event information associated with multiple subjects 130 across multiple sessions. As another example, a subject 130 may be able to review fluency scores across multiple sessions (e.g., multiple speaking engagements, sessions across multiple workdays, etc.). Further, UI module 360 may include various analysis and/or presentation features. For instance, a practitioner may be able to filter events in various ways (e.g., by selecting a specific set of event types for review and/or analysis). As another example, UI module 360 may provide analysis related to selected event types and/or other performance information (e.g., by indicating that user performance declines throughout the day, by indicating that a user performs better or worse in certain environments, by correlating performance to sleep duration or time spent exercising, etc.).

Machine learning module 370 may perform various machine learning algorithms or processes associated with event detection, model generation or validation, feedback, and/or other relevant features of speech fluency engine 100. Machine learning module 370 may utilize training data 390 to generate, update, and/or otherwise modify speech pattern models 110 and/or other models that may be utilized by some embodiments (e.g., feedback models, UI models, etc.). Model training data may include sensor data (e.g., captured speech) that may be processed and/or pre-processed in various ways (e.g., by converting from time-domain signals to frequency-domain signals) and various types of associated classification data. In some embodiments, model training data may include, for example, known stuttering patterns that may be provided by a practitioner (e.g., via a text-based UI).

Classification data and/or other training data 390 may be generated by a resource such as a practitioner, another artificial intelligence resource, a subject 130, and/or other appropriate resource. Classification data may include, for instance, event information entered by a practitioner or other reviewer, such as event type, event start time, event end time, recommended feedback type and/or content, etc. As another example, classification data may include, for instance, event information for events detected by event detector 320 and associated feedback (if any) received from a subject 130 or practitioner via a resource such as UI module 360.

Speech pattern models 110 (and/or other types of models) may be associated with various types (and/or sets) training data 390, such as sensor data. For example, a first speech pattern model 110 may utilize time-domain data while a second speech pattern model 110 may utilize frequency-domain data. As another example, a speech pattern model 110 associated with prediction of a stuttering event may utilize extracted speech from captured audio and/or extracted environmental noise (e.g., traffic, conversation, etc.) from the captured audio. As still another example, a speech pattern model 110 associated with generating a fluency score and/or other feedback may utilize sensor data such as captured audio (e.g., speech), time of day, biometric data (e.g., heart rate), medication schedule or dosage, self-evaluation information, etc.

During real-time execution, speech pattern models 110 may utilize various input information, such as sensor data, to detect events, generate feedback, and/or otherwise perform operations associated with speech fluency engine 100. Speech pattern models 110 may provide indications of, and/or references to, various feedback elements (e.g., a type of feedback, feedback content, feedback templates, etc.).

Feedback models may be based on various sets of training data. For example, such training data may include performance as measured by speech fluency engine 100 before and after feedback was provided. As another example, training data may include feedback ratings or effectiveness scores received from one or more practitioners based on review of event data (and/or other relevant data). Training data for feedback models may include data such as sensor data, detected event information, subject feedback, and/or other relevant data.

During real-time execution, feedback models may utilize various input information, such as detected event data, to generate feedback, receive feedback, and/or otherwise perform operations associated with speech fluency engine 100. Feedback models may provide indications of, and/or references to, various event models or elements (e.g., types of associated events, relevant sensor data, etc.).

Machine learning module 370 may interact with other modules to analyze data and/or provide relevant feedback. For instance, machine learning module 370 and feedback generator 350 may analyze event information across multiple events and/or sessions to correlate feedback to relevant information such as environmental factors. For instance, machine learning module 370 and/or feedback generator 350 may determine that a stuttering event is more likely to be detected when a subject 130 is speaking to an authority figure such as a boss or teacher than when the subject 130 is speaking to a peer or subordinate.

Local storage 380 may include various electronic components or devices, databases, lookup tables, and/or other structures, and/or other resources that may be used to store, provide, update, and/or otherwise manipulate data and/or instructions. Local storage 380 may include or otherwise provide resources such as event database 340, speech pattern models 110, training data 390, etc. The various other components of speech fluency engine 100 and/or other components of environment 200 may be able to access or otherwise utilize local storage 380 (e.g., by sending and/or receiving messages via communication module 330).

One of ordinary skill in the art will recognize that the various elements described above may be implemented in various different ways without departing from the scope of the disclosure. For instance, environment 200 may include various other devices and/or components. As another example, speech fluency engine 100 may include various other components or elements and/or the listed components may be arranged in different configurations.

Figure 4:
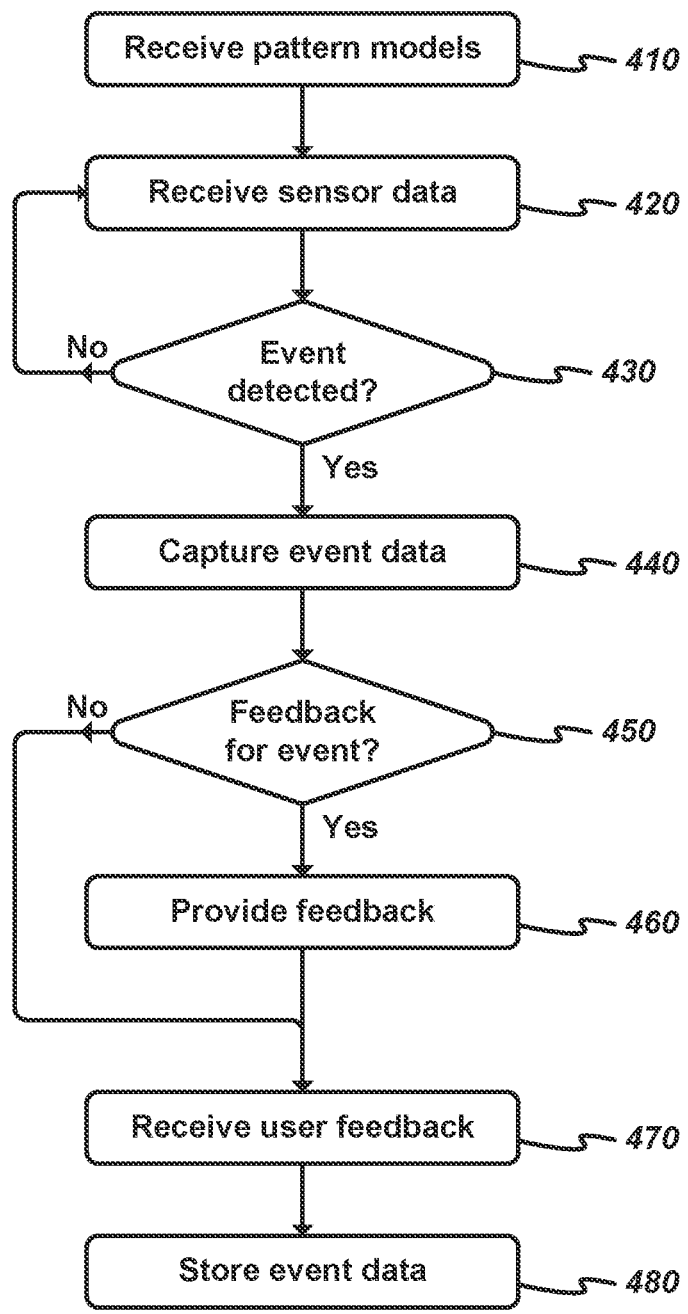
FIG. 4 illustrates a flow chart of an exemplary process that detects events and provides feedback in real time.

FIG. 4 illustrates an example process 400 for detecting events and providing feedback in real time. Process 400 may automatically detect events, and/or otherwise measure performance, in real-time (and/or during later analysis) and/or generate feedback related to the detected events or performance. The process may be performed when a speech fluency engine 100 is turned on or otherwise enabled, when speech is detected, when a user activates an application, and/or under other appropriate conditions. In some embodiments, process 400 may be performed by speech fluency engine 100, and specifically, by elements such as event detector 320 and/or feedback generator 350, among others.

As shown, process 400 may include receiving (at 410) pattern models. Such pattern models may include models such as speech pattern models 110. Various other types of models may be received (e.g., feedback models, UI models, etc.). Such models may be received from a resource such as local storage 380, speech evaluation server 210, and/or remote storage 230.

Process 400 may include receiving (at 420) sensor data. Sensor data may be received from various appropriate resources, such as local storage 380, sensor interface 310, a user device 120, etc. Sensor data may be received in various forms or formats and may be processed and/or transposed in various appropriate ways (e.g., by extracting audio information from an audiovisual stream and performing a Fourier transform on the audio information).

The process may include determining (at 430) whether an event has been detected. A resource such as event detector 320 may receive the sensor data, speech pattern models 110, and/or other relevant information and determine whether an event has occurred and/or is predicted to occur (e.g., by applying the speech pattern models 110 to the received sensor data). Event detection may be performed in real time and/or during later analysis. Each event type may be associated with one or more machine learning models (e.g., speech pattern models 110). Events may be detected based on various sets of evaluation criteria such as matching phrases or sections of text and/or other relevant evaluation criteria (e.g., minimum or maximum fluency score threshold exceeded, maximum delay exceeded, etc.).

If process 400 determines (at 430) that an event has not been detected, the process may repeat operations 420-430 until the process determines (at 430) that an event has been detected.

If process 400 determines (at 430) that an event has been detected, the process may include capturing (at 440) event data. Such event data may include, for instance, sensor data 310 such as an audio feed, video feed, etc. In some cases, event data may include snapshot or polling data from various resources available to speech fluency engine (such as via user device 120). Such data may include, for instance, location information, environmental information, timestamp information, etc.

Process 400 may include determining (at 450) whether any feedback is associated with the detected event. Such a determination may be made based on various relevant factors and/or information, such as a reference to a feedback element or model in a speech pattern model 110 associated with an event. As another example, each event type may be listed in a resource such as a lookup table, and associated feedback option may be listed (if any). If multiple feedback models or options are appropriate, the various options may be ranked or scored (e.g., using feedback models) to identify the optimal feedback. In some cases, multiple types or instances of feedback may be provided based on a single identified event.

If process 400 determines (at 450) that feedback is associated with the detected event, the process may include providing (at 460) the feedback. Feedback may be provided via a resource such as UI module 360 and/or a device such as user device 120 and/or practitioner device 220. Feedback may be provided to various parties, such as subject 130, a practitioner associated with the subject 130, etc. Feedback may include, for instance, graphic feedback such as text, video, flashing lights, etc. As another example, feedback may include audio feedback or cues (e.g., spoken words, tones, alarms, etc.). As still another example, feedback may include haptic feedback such as vibration. Feedback may be provided in real time and/or stored for later presentation and/or review.

As shown, process 400 may include receiving (at 470) user feedback. User feedback may include, for instance, feedback received from a subject 130 (e.g., indicating mood, energy level, self-assessment, agreement or disagreement with event identification, etc.). As another example, user feedback may include, for instance, practitioner feedback (e.g., agreement or disagreement with event identification, assessment or score, etc.).

Process 400 may include storing (at 480) event data. Data related to events may include, for instance, a unique event identifier, event type, duration, timestamp, captured sensor data, user feedback, associated machine learning models or other evaluation criteria, etc. Data related to events may include a fluency score and/or other metrics that may be calculated at least partly based on event data, sensor data, and/or other relevant data. Event data may be stored locally at a resource such a local storage 380 and/or sent to a resource such as user device 120, practitioner device 220, and/or speech evaluation server 210.

Based on the detected events, one or more feedback models, and/or other relevant information (e.g., provided and/or received feedback), a fluency score or other performance metric may be generated. Such a fluency score may be based on one or more relevant assessments of performance. For example, assessments may include event information (e.g., total number of events, event rate, etc.), rate of speech (e.g., words per minute), total amount of speech (e.g., hours and minutes of speech during a day), total amount of fluent speech (e.g., hours and minutes of speech that meet or exceed some fluency criteria), average delay between words or phrases, tone, volume, etc. The fluency score or other metric may be calculated based on such assessments (e.g., ratio of fluent speech to total speech as measured or indicated by number of words, length of speech or elapsed speech time, etc.). Fluency criteria may include various attributes and/or parameters associated with various thresholds or other criteria. For instance, fluent speech may be based on fluency criteria such as minimum number of words per minute, minimum vocabulary or language usage, maximum number of events per minute, etc. Fluency criteria may depend on the application. For instance, fluency criteria related to stuttering may include minimum rate of speech and maximum number of events while fluency criteria related to learning a second language may include minimum rate of speech and minimum vocabulary.

Figure 5:
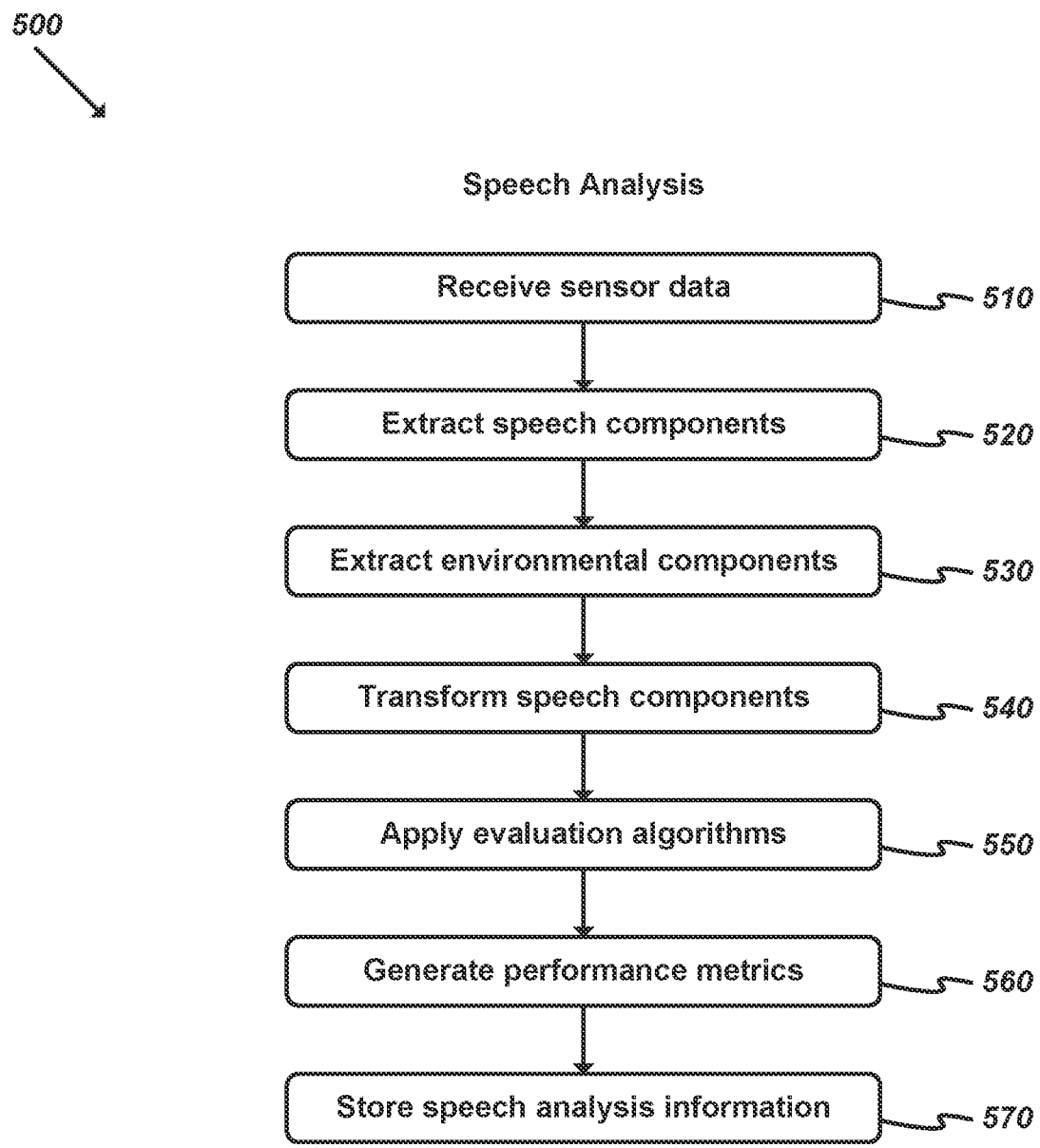
FIG. 5 illustrates a flow chart of an exemplary process that analyzes speech.

FIG. 5 illustrates an example process 500 for analyzing speech. Such speech analysis may be utilized to identify events and/or generate various fluency scores or other evaluation metrics The process may be performed when a speech fluency engine 100 is turned on or otherwise enabled, when speech or other audio is detected, when a user activates an application, and/or under other appropriate conditions. In some embodiments, process 500 may be performed by speech fluency engine 100, and specifically, by elements such as event detector 320 and/or sensor interface 310, among others.

As shown, process 500 may include receiving (at 510) sensor data. Sensor data may be received via a resource such as sensor interface 310.

Process 500 may include extracting (at 520) speech components of the received sensor data. Audio data included in the received sensor data may be processed to isolate and/or otherwise extract speech components of the received sensor data. Video data, such as captured facial movements during speech may be similarly extracted, isolated, and/or otherwise processed.

The process may include extracting (at 530) environmental components. Environmental components may include, for example, elements of received audio data (e.g., traffic noise, nearby conversations, etc.). Other environmental data may be collected and/or extracted (e.g., time of day, presence or absence of other parties, environment type (e.g., school, work, home, etc.), etc.).

As shown, process 500 may include transforming (at 540) the speech components and/or other received data. Such transformation may include, for instance, converting speech to text, converting time domain signals to frequency domain signals, etc.

Process 500 may include applying (at 550) evaluation algorithms. Such application may include, for instance, evaluating the received sensor data using resources such as speech pattern models 110. Other types of algorithms may include, for instance, text-based matching, audio matching, etc.

The process may include generating (at 560) performance metrics. Performance metrics may be generated based on the results of the various applied evaluation algorithms. For instance, a fluency score may be generated based on evaluation data such as rate of speech, event rate, etc.

As shown, process 500 may include storing (at 570) speech analysis information. Speech analysis information may be associated and/or stored in various appropriate ways and/or formats. For instance, event information may include an event identifier, type, sensor data (e.g., captured audio), a unique speech pattern model identifier, etc. As another example, fluency score data may include a unique subject identifier, timestamp, duration of speech used to generate the fluency score, speech pattern model identifier, etc.

Figure 6:
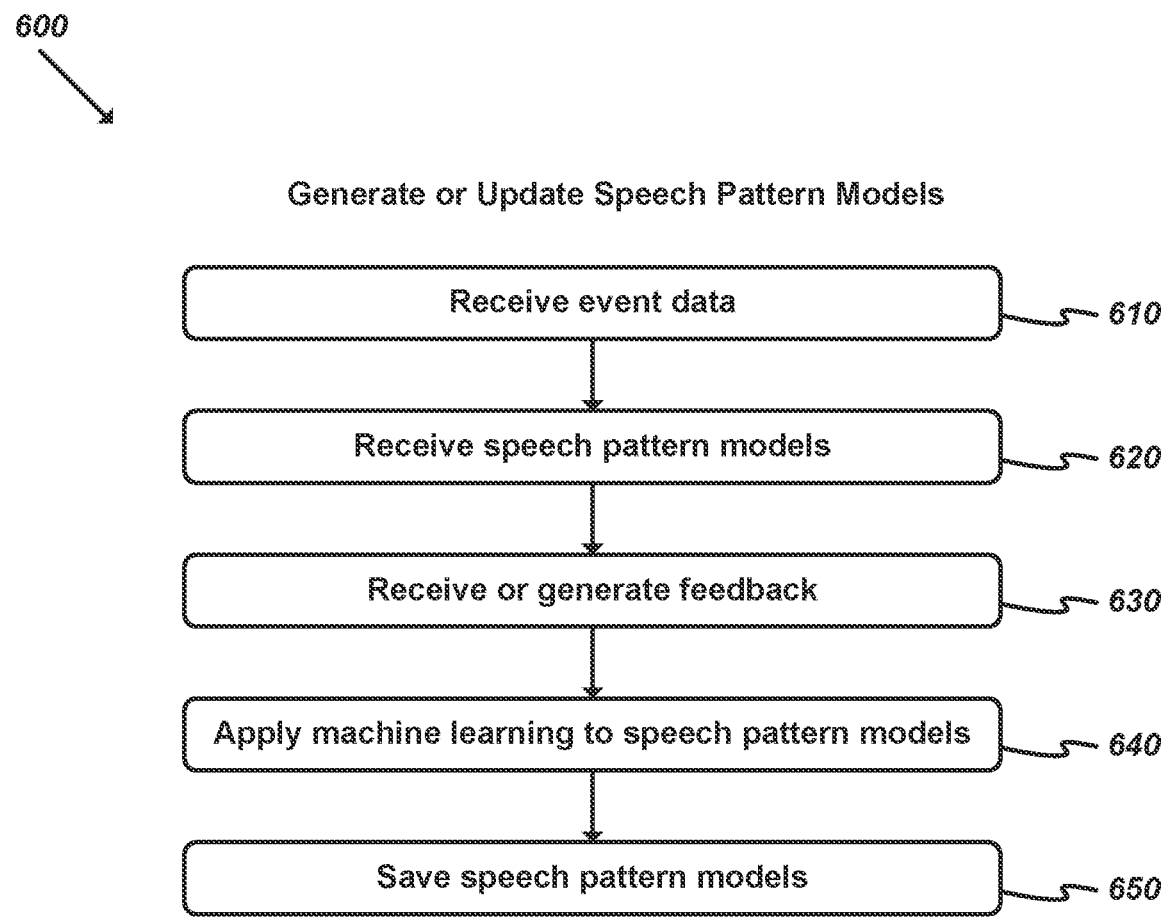
FIG. 6 illustrates a flow chart of an exemplary process that generates or updates speech pattern models of some embodiments.

FIG. 6 illustrates an example process 600 for generating or updating speech pattern models 110 of some embodiments. Such a process may utilize training data including sensor data and/or classification data to generate or update one or more speech pattern models 110. Similar processes may be used to train other types of models, such as feedback models or UI models, among others. The process may be performed when a speech fluency engine 100 is turned on or otherwise enabled, when training data becomes available, at regular intervals, and/or under other appropriate conditions. In some embodiments, process 600 may be performed by speech fluency engine 100, and specifically, by elements such as machine learning module 370 and/or event database 340, among others. In some embodiments, process 600 may be performed by a resource such as speech evaluation server 210 and the new or updated speech pattern models 110 may be distributed to various appropriate speech fluency engines 100 (and/or other resources, such as user device 120).

As shown, process 600 may include receiving (at 610) event data. Even data may be received from a resource such as event database 340 and may include information such as event type, event evaluation criteria, captured sensor data associated with an event, etc. Event data may be associated with one or more subjects 130, where subjects may be associated based on various relevant criteria (e.g., usage application, severity of condition, treatment type, etc.).

Process 600 may include receiving (at 620) speech pattern models 110. Speech pattern models 110 may be received from a resource such as local storage 380. Speech pattern models 110 may include machine learning models, matching data, references to other elements, and/or other appropriate data.

The process may include receiving or generating (at 630) feedback. Such feedback may include, for instance, classification data such as an event type identified by a resource such as a practitioner or subject. In some embodiments, feedback may be generated by a machine learning model or other automated evaluation tool.

As shown, process 600 may include applying (at 640) machine learning to speech pattern models 110. Application of machine learning may include training the speech pattern models 110 based on the received event data and received or generated feedback (and/or other classification data).

Process 600 may include saving or updating (at 650) speech pattern models 110. The new and/or updated speech pattern models 110 may be stored at a resource such as local storage 380 and/or may be provided to a resource such as speech evaluation server 210 or remote storage 230.

One of ordinary skill in the art will recognize that processes 400-600 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 7:
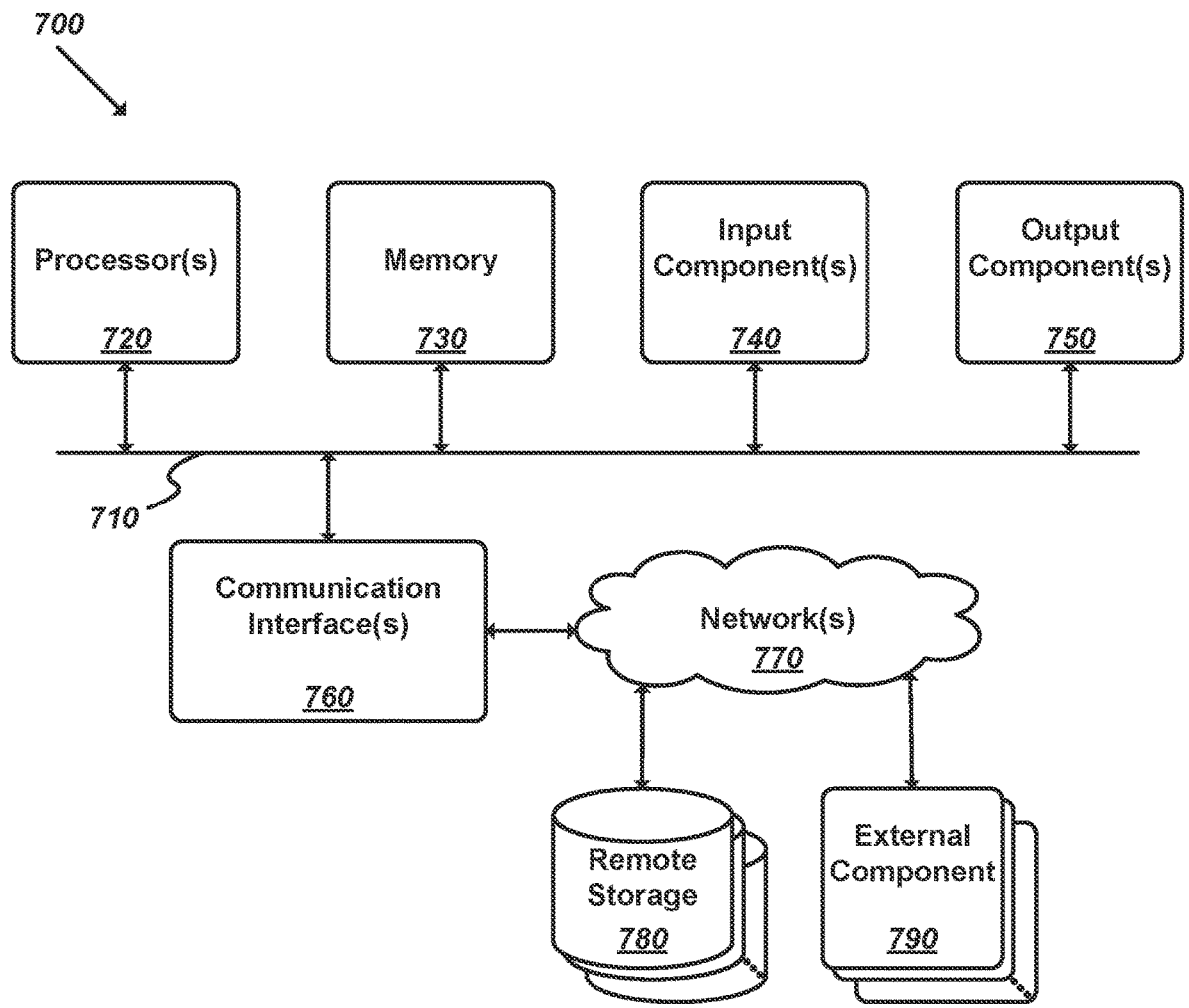
FIG. 7 illustrates a schematic block diagram of one or more exemplary devices used to implement various embodiments.

FIG. 7 illustrates a schematic block diagram of an exemplary device (or system or devices) 700 used to implement some embodiments. For example, the systems, devices, components, and/or operations described above in reference to FIG. 1, FIG. 2, and FIG. 3 may be at least partially implemented using device 700. As another example, the processes described in reference to FIG. 4, FIG. 6, and FIG. 5 may be at least partially implemented using device 700.

Device 700 may be implemented using various appropriate elements and/or sub-devices. For instance, device 700 may be implemented using one or more personal computers (PCs), servers, mobile devices (e.g., smartphones), tablet devices, wearable devices, and/or any other appropriate devices. The various devices may work alone (e.g., device 700 may be implemented as a single smartphone) or in conjunction (e.g., some components of the device 700 may be provided by a mobile device while other components are provided by a server).

As shown, device 700 may include at least one communication bus 710, one or more processors 720, memory 730, input components 740, output components 750, and one or more communication interfaces 760.

Bus 710 may include various communication pathways that allow communication among the components of device 700. Processor 720 may include a processor, microprocessor, microcontroller, digital signal processor, logic circuitry, and/or other appropriate processing components that may be able to interpret and execute instructions and/or otherwise manipulate data. Memory 730 may include dynamic and/or non-volatile memory structures and/or devices that may store data and/or instructions for use by other components of device 700. Such a memory device 730 may include space within a single physical memory device or spread across multiple physical memory devices.

Input components 740 may include elements that allow a user to communicate information to the computer system and/or manipulate various operations of the system. The input components may include keyboards, cursor control devices, audio input devices and/or video input devices, touchscreens, motion sensors, etc. Output components 750 may include displays, touchscreens, audio elements such as speakers, indicators such as light-emitting diodes (LEDs), printers, haptic or other sensory elements, etc. Some or all of the input and/or output components may be wirelessly or optically connected to the device 700.

Device 700 may include one or more communication interfaces 760 that are able to connect to one or more networks 770 or other communication pathways. For example, device 700 may be coupled to a web server on the Internet such that a web browser executing on device 700 may interact with the web server as a user interacts with an interface that operates in the web browser. Device 700 may be able to access one or more remote storages 780 and one or more external components 790 through the communication interface 760 and network 770. The communication interface(s) 760 may include one or more application programming interfaces (APIs) that may allow the device 700 to access remote systems and/or storages and also may allow remote systems and/or storages to access device 700 (or elements thereof).

It should be recognized by one of ordinary skill in the art that any or all of the components of computer system 700 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 700 may perform various operations in response to processor 720 executing software instructions stored in a computer-readable medium, such as memory 730. Such operations may include manipulations of the output components 750 (e.g., display of information, haptic feedback, audio outputs, etc.), communication interface 760 (e.g., establishing a communication channel with another device or component, sending and/or receiving sets of messages, etc.), and/or other components of device 700.

The software instructions may be read into memory 730 from another computer-readable medium or from another device. The software instructions stored in memory 730 may cause processor 720 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used.

Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

We claim:

1. A device, comprising:
   one or more processors configured to:
   collect audio data;
   extract speech information from the collected audio data;
   extract environment information from the collected audio data;
   analyze the extracted speech information and the extracted environment information;
   identify at least one speech event based on the analysis of the extracted speech information and the extracted environment information; and
   generate a performance metric based at least partly on the at least one speech event.

2. The device of claim 1, wherein analyzing the extracted speech information comprises application of a speech pattern model.

3. The device of claim 1, wherein analyzing the extracted speech information comprises transforming the extracted speech information from a time domain to a frequency domain.

4. The device of claim 1, wherein the one or more processors are further configured to provide feedback associated with the at least one speech event wherein providing feedback comprises at least one of displaying text, displaying graphics, and providing haptic feedback.

5. The device of claim 4, wherein feedback is provided in real time during collection of audio data.

6. The device of claim 1, wherein collecting audio data comprises capturing audio received via a user device microphone.

7. The device of claim 1, wherein the performance metric comprises a fluency score calculated by dividing fluent speech by total speech.

8. A non-transitory computer-readable medium, storing a plurality of processor executable instructions to:
   collect audio data;
   extract speech information from the collected audio data;
   extract environment information from the collected audio data;
   analyze the extracted speech information and the extracted environment information;
   identify at least one speech event based on the analysis of the extracted speech information and the extracted environment information; and
   generate a performance metric based at least partly on the at least one speech event.

9. The non-transitory computer-readable medium of claim 8, wherein analyzing the extracted speech information comprises application of a speech pattern model.

10. The non-transitory computer-readable medium of claim 8, wherein analyzing the extracted speech information comprises transforming the extracted speech information from a time domain to a frequency domain.

11. The non-transitory computer-readable medium of claim 8, wherein the plurality of processor-executable instructions are further to provide feedback associated with the at least one speech event wherein providing feedback comprises at least one of displaying text, displaying graphics, and providing haptic feedback.

12. The non-transitory computer-readable medium of claim 11, wherein feedback is provided in real time during collection of audio data.

13. The non-transitory computer-readable medium of claim 8, wherein collecting audio data comprises capturing audio received via a user device microphone.

14. The non-transitory computer-readable medium of claim 8, wherein the performance metric comprises a fluency score calculated by dividing fluent speech by total speech.

15. A method comprising:
   collecting audio data;
   extracting speech information from the collected audio data;
   extracting environment information from the collected audio data;
   analyzing the extracted speech information and the extracted environment information;
   identifying at least one speech event based on the analysis of the extracted speech information and the extracted environment information; and
   generating a performance metric based at least partly on the at least one speech event.

16. The method of claim 15, wherein analyzing the extracted speech information comprises application of a speech pattern model.

17. The method of claim 15, wherein analyzing the extracted speech information comprises transforming the extracted speech information from a time domain to a frequency domain.

18. The method of claim 15 further comprising providing feedback associated with the at least one speech event, wherein providing feedback comprises at least one of displaying text, displaying graphics, and providing haptic feedback, and wherein feedback is provided in real time during collection of audio data.

19. The method of claim 15, wherein collecting audio data comprises capturing audio received via a user device microphone.

20. The method of claim 15, wherein the performance metric comprises a fluency score calculated by dividing fluent speech by total speech.

* * * * *